US012157261B2

(12) United States Patent
Walter (10) Patent No.: US 12,157,261 B2
(45) Date of Patent: Dec. 3, 2024

(54) MIXING AND PLASTICATING MACHINE HAVING A FILLING DEVICE WITH A SEPARATING WALL, WHERE THE FILLING DEVICE IS ARRANGED ON A HOUSING OF THE MACHINE, AND METHOD RELATED THERETO

(71) Applicant: Buss AG, Pratteln (CH)

(72) Inventor: Wolfgang Walter, Aalen (DE)

(73) Assignee: Buss AG, Pratteln. (CH)

( * ) Notice: Subject to any disclaimer, the term of this patent is extended or adjusted under 35 U.S.C. 154(b) by 740 days.

(21) Appl. No.: 17/294,583

(22) PCT Filed: Nov. 7, 2019

(86) PCT No.: PCT/EP2019/080513
§ 371 (c)(1),
(2) Date: May 17, 2021

(87) PCT Pub. No.: WO2020/104201
PCT Pub. Date: May 28, 2020

(65) Prior Publication Data
US 2022/0001589 A1    Jan. 6, 2022

(30) Foreign Application Priority Data

Nov. 22, 2018 (EP) .................................... 18207797

(51) Int. Cl.
*B29C 48/50* (2019.01)
*B29B 7/42* (2006.01)
(Continued)

(52) U.S. Cl.
CPC ............ *B29C 48/501* (2019.02); *B29B 7/423* (2013.01); *B29B 7/428* (2013.01); *B29B 7/60* (2013.01);
(Continued)

(58) Field of Classification Search
CPC ... B29C 48/501; B29C 48/285; B29C 48/397; B29C 48/45; B29C 48/288;
(Continued)

(56) References Cited

U.S. PATENT DOCUMENTS 3,148,412 A * 9/1964 Spreeuwers .......... B29C 48/288
264/211
3,199,145 A    8/1965 Tiemersma
(Continued)

FOREIGN PATENT DOCUMENTS

AT       512170 B1 *  6/2013  ......... B29B 17/0005
CH       278575       11/1949
(Continued)

*Primary Examiner* — Charles Cooley
(74) *Attorney, Agent, or Firm* — Anderson Patent Law Firm LLC (57) ABSTRACT

Mixing and plasticating machine (100) for continuous conditioning processes, comprising: a housing (10) in which a hollow interior (18) is formed that is delimited by the interior peripheral surface of the housing (10) and extends in the longitudinal direction of the mixing and plasticating machine (100); a screw shaft (12) which extends through the interior (18) of the housing (10), rotates in the interior (18) of the housing (10) during operation and simultaneously moves translationally back and forth; a drive which rotates the screw shaft (12) during operation; and a filling device (36) arranged on the housing (10), for feeding at least one starting material into the interior (18) of the housing (10), the filling device (36) extending through a cut-out (42) that extends through the housing wall (40) or being connected to a cut-out (42) that extends through the housing wall (40), the filling device (36) comprising at least two cavities (54, 54') that each extend over the height of the filling device (36), which cavities are separated from one another by at least one separating wall (52, 52').

12 Claims, 6 Drawing Sheets

(51) Int. Cl.
 *B29B 7/60* (2006.01)
 *B29C 48/285* (2019.01)
 *B29C 48/395* (2019.01)
 *B29C 48/45* (2019.01)

(52) U.S. Cl.
 CPC .......... *B29C 48/285* (2019.02); *B29C 48/397* (2019.02); *B29C 48/45* (2019.02)

(58) Field of Classification Search
 CPC ..... B29C 48/375; B29C 48/505; B29B 7/423; B29B 7/428; B29B 7/60; B29B 7/603
 USPC .............................. 366/76.9–76.93, 80, 289
 See application file for complete search history.

(56) References Cited

U.S. PATENT DOCUMENTS

| | | | | |
|---|---|---|---|---|
| 3,360,824 | A * | 1/1968 | Schippers | B29C 48/501 264/102 |
| 3,367,635 | A * | 2/1968 | Gresch | B29B 7/845 366/90 |
| 3,376,603 | A | 4/1968 | Colombo | |
| 3,458,894 | A | 8/1969 | Wheeler | |
| 3,601,370 | A * | 8/1971 | Ruettener | B29B 7/426 366/322 |
| 3,866,890 | A * | 2/1975 | Tadmor | B29C 48/29 366/89 |
| 3,871,629 | A * | 3/1975 | Hishida | B29C 45/1816 366/144 |
| 3,932,115 | A * | 1/1976 | Maxwell | B29C 48/76 432/5 |
| 3,999,921 | A * | 12/1976 | Thor | B29B 7/42 366/76.9 |
| 4,054,403 | A * | 10/1977 | Hornbeck | B29C 48/338 425/300 |
| 4,094,946 | A * | 6/1978 | Finkensiep | B29C 48/022 425/208 |
| 4,164,385 | A * | 8/1979 | Finkensiep | B29C 48/445 264/211 |
| 4,252,755 | A * | 2/1981 | Normanton | B29C 44/22 366/76.9 |
| 4,332,480 | A | 6/1982 | Anders | |
| 4,937,034 | A * | 6/1990 | Sewell | B29C 48/29 366/76.9 |
| 5,013,233 | A | 5/1991 | Semmekrot | |
| 5,096,302 | A * | 3/1992 | Durina | B29C 31/02 264/211.21 |
| 5,158,784 | A | 10/1992 | Semmekrot | |
| 5,302,635 | A | 4/1994 | Brinkmann et al. | |
| 5,358,693 | A | 10/1994 | Brinkmann et al. | |
| 7,694,900 | B2 | 4/2010 | Irie et al. | |
| 7,909,500 | B2 | 3/2011 | Grutter et al. | |
| 8,500,433 | B2 | 8/2013 | Riehle | |
| 2004/0234607 | A1 | 11/2004 | Irie et al. | |
| 2008/0267004 | A1 | 10/2008 | Deters et al. | |
| 2008/0277052 | A1* | 11/2008 | Pierz | B29C 48/12 156/244.11 |
| 2009/0027994 | A1 | 1/2009 | Grutter et al. | |
| 2010/0143518 | A1 | 6/2010 | Riehle | |
| 2015/0217878 | A1 | 8/2015 | Fux et al. | |
| 2022/0001589 | A1* | 1/2022 | Walter | B29C 48/45 |
| 2024/0140013 | A1* | 5/2024 | Haselmann | B29C 48/287 |

FOREIGN PATENT DOCUMENTS

| | | | |
|---|---|---|---|
| CH | 464656 | 10/1968 | |
| CH | 695934 A5 | 10/2006 | |
| CN | 1569431 A | 1/2005 | |
| CN | 101746037 A | 6/2010 | |
| CN | 104175411 A | 12/2014 | |
| CN | 204036796 U | 12/2014 | |
| DE | 102010015320 A1 * | 11/2011 | ........... B29C 31/061 |
| DE | 102014210375 A1 * | 12/2015 | ............. B29C 45/18 |
| EP | 0340873 B1 | 7/1992 | |
| EP | 1175293 B1 | 1/2004 | |
| EP | 0983133 B1 | 11/2004 | |
| EP | 3656523 A1 * | 5/2020 | ............. B29B 7/423 |
| JP | 50-064359 S | 5/1975 | |
| JP | 60-115424 S | 6/1985 | |
| JP | 01-020311 H | 1/1989 | |
| JP | 06-020019 H | 3/1994 | |
| JP | 07-009489 H | 1/1995 | |
| JP | 2001-191394 | 7/2001 | |
| RU | 2050273 C1 | 12/1995 | |
| RU | 2391203 C2 | 6/2010 | |
| SU | 965343 | 10/1982 | |
| WO | 2007/054084 A2 | 5/2007 | |
| WO | 2011/014902 A1 | 2/2011 | |
| WO | 2014/056010 A1 | 4/2014 | |

* cited by examiner

MIXING AND PLASTICATING MACHINE HAVING A FILLING DEVICE WITH A SEPARATING WALL, WHERE THE FILLING DEVICE IS ARRANGED ON A HOUSING OF THE MACHINE, AND METHOD RELATED THERETO

The present invention relates to a mixing and plasticating machine for continuous conditioning processes, such as for producing granules, extruded profiles or molded parts, and a method for mixing and plasticating a starting material using such a mixing and plasticating machine.

Such mixing and plasticating machines are used in particular for conditioning plastic and/or pasty materials. The working element of such a mixing and plasticating machine forms a screw shaft arranged therein, which transports or conveys the material to be processed forwards in the axial direction and thereby mixes the components of the material with one another. For example, such mixing and plasticating machines are used for processing viscoplastic materials, for homogenizing and plasticizing plastics, for incorporating filler and reinforcing materials and for producing starting materials for the food industry. Very frequently, the starting material or at least one component of the starting material is present as a particulate material, such as, for example, as powder or granules. These mixing and plasticating machines can be operated, for example, in such a way that a melt is first produced from the starting material before the melt thus produced is conveyed by the screw shaft in the axial direction through the mixing and plasticating machine and is thereby homogenized. Depending on the material to be mixed, the temperature set in the mixing and plasticating machine can be between 50° and 400° C. at least in some sections. Such mixing and plasticating machines are also suitable, in particular, for producing polymer granules, polymer extruded profiles, polymer molded parts and the like, if on the downstream end of the machine a suitable discharge device, for example, a discharge extruder, is arranged and is connected to a granulation device or a similar device, such as to an intermittent cutting device, strand die, profile tool, sheet die or a similar device.

Such mixing and plasticating machines are known, for example, from CH 278 575 A and from CH 464 656. In these mixing and plasticating machines, the screw shaft preferably executes not only a rotational movement, but also moves at the same time back and forth in a translational manner in the axial direction, i.e., in the direction of the screw shaft. The movement sequence is therefore preferably characterized in that the screw shaft performs an oscillatory movement superimposed on the rotation when viewed in the axial direction. This movement sequence makes it possible to introduce built-in elements, namely plasticating elements, such as plasticating bolts or plasticating teeth, into the housing of the introduction and mixing device. Because of the presence of the plasticating bolts or the plasticating teeth, the screw arranged on the main shaft, the so-called shaft rod, does not extend continuously—when viewed in the cross-section of the shaft rod—but is divided into a plurality of individual wing elements, which each extend over a certain angular section of the cross-sectional periphery of the shaft rod. Adjacent wing elements are spaced apart from one another both in the axial direction and in the outer peripheral direction of the shaft rod, i.e., a gap is provided in each case between adjacent wing elements both in the axial direction and in the outer peripheral direction of the shaft rod. If, for example, the entire shaft rod of the screw shaft or an axial section of the shaft rod of the screw shaft, relative to the cross-sectional periphery, comprises three wing elements, each of which extends over an angular section of, for example, 100° of the cross-sectional periphery of the shaft rod, one speaks of a three-winged screw shaft or a three-winged screw shaft section. The rotation and the translational movement of the screw shaft in the axial direction are controlled in such a way that the individual wing elements pass with their flanks into the vicinity of the corresponding plasticating elements, in order to compress the material to be mixed and plasticated and exert a shearing action thereon, in order to thus carry out the mixing and/or plasticating operation without the plasticating elements colliding with the wing elements. Apart from this, the plasticating elements come close to the flanks of the wing elements in such a way that the plasticating elements prevent deposits of components of the mixture on the flanks of the wing elements, so that the plasticating elements also effect a cleaning of the wing elements as a result. Of course, the number and geometry of the wing elements must be adapted to the number of plasticating elements.

A challenge in these mixing and plasticating machines is the sealing of the reciprocating rotational and oscillatory screw shaft to the gearbox flange connected thereto, via which the screw shaft is connected to the gearbox. Such a seal is particularly important in order to prevent the escape of particulate material, such as, in particular, powder and finely divided granules, from the process chamber of the mixing and plasticating machine into the gearbox flange connected thereto or even into the gearbox. When particulate material is fed, for example, through a filling funnel, air is automatically introduced into the process chamber of the mixing and plasticating machine, because the bulk density of such particulate material is frequently 0.5 to 0.7 g/cm$^3$ and, in the case of some starting materials, even below it. This air introduced via the filling funnel with the introduced particulate starting material must preferably be able to escape again from the process chamber of the mixing and plasticating machine through the filling funnel, because the seal between the support shaft of the screw shaft, the housing wall surrounding the latter and the gearbox flange is designed to be air-tight. However, escape of the air from the process chamber through the filling funnel does not work in practice or at least not reliably, specifically in particular not when the filling opening is covered with a material cushion. The axial movement of the screw presses the air against the seal during the backward stroke. As soon as the pre-tensioning of the seal diminishes, the air escapes through the resulting gap between the support shaft, the housing wall surrounding it and the gearbox flange, and this air entrains powder or fine granular particles, which then accumulate in the gearbox flange and then destroy the shaft sealing rings of the output shaft and/or even penetrate into the gearbox, as a result of which the bearing and other gearbox parts can be destroyed. Another part of the particulate starting material then accumulates on the machine frame and is swirled up upon each air movement. Stuffing boxes are frequently used for the purpose of sealing the support shaft. However, these only avoid the penetration of air and entrained particles into the gearbox flange for a comparatively short operating time of typically about 2 weeks. Accordingly, the stuffing boxes of such mixing and plasticating machines must be replaced.

Based on this, the problem addressed by the present invention is to provide such a mixing and plasticating machine, in the operation of which the seal, in particular a stuffing box, arranged between the support shaft, the housing wall surrounding the latter and the gearbox flange is relieved, so that its operating time or time span is extended during which the said seal keeps the connecting region between the support shaft and the gearbox flange air-tight or reliably prevents the penetration of air and particulate material from the process chamber of the mixing and plasticating machine into the gearbox flange.

According to the invention, this problem is solved by a mixing and plasticating machine for continuous conditioning processes, such as for plasticating and mixing particulate starting material and/or for producing granules, extruded profiles or molded parts, having a housing, in which a hollow interior is formed which is delimited by the inner peripheral surface of the housing and extends in the longitudinal direction of the mixing and plasticating machine, having a screw shaft which extends at least in some sections in the axial direction through the interior of the housing, which, during operation, rotates in the (preferably cylindrical) interior of the housing and simultaneously moves back and forth translationally in the axial direction, having a drive, which rotates the screw shaft during operation, and having a filling device arranged on the housing for feeding at least one starting material to be mixed and plasticated into the interior of the housing, wherein the filling device extends through a cut-out extending through the housing wall or is connected to a cut-out extending through the housing wall, wherein the filling device comprises at least two cavities which each extend over the height of the filling device, which cavities are separated from each other by at least one separating wall.

By virtue of the fact that the filling device, such as in particular the filling funnel, of the mixing and plasticating machine, comprises at least two cavities separated from one another by at least one separating wall and each extending over the height of the filling device, it is easily possible to relieve the seal or stuffing box during the operation of the mixing and plasticating machine. As a result of this design of the filling device, it is namely achieved that air introduced into the process chamber or interior of the mixing and plasticating machine by feeding the starting material via one of the cavities of the filling device is easily removed from the mixing and plasticating machine once again via the other cavity or at least for the most part via the other cavity of the filling device. Since the filling device extends through the cut-out extending through the housing wall or is connected thereto, the two cavities of the filling device of the mixing and plasticating machine are connected in their lower region to the interior or process chamber, i.e., the intermediate space between the screw shaft and the housing inner peripheral surface, of the mixing and plasticating machine. Entrained air, which is introduced through one of the two cavities into the process chamber via the cut-out, namely for this reason can penetrate into said cavity via the lower opening of the adjacent cavity of the filling device and escape through the said cavity from the bottom upwards through the filling device into the environment. In order to improve the escape of the air through said cavity of the filling device, a vacuum, such as, for example, a vacuum between 50 kPa and just below 100 kPa, can also be applied to said cavity. Thus, in the mixing and plasticating machine according to the invention, one of the at least two cavities of the filling device functions as a feed or filling channel for the starting material, whereas another of the at least two cavities of the filling device functions as a venting channel. Therefore, the air introduced into the process chamber during the feeding of the starting material is quickly and reliably removed, so that the latter cannot accumulate or at least not to an appreciable extent in the process chamber and cannot be pressed against the stuffing box during the backward stroke of the screw shaft which moves back and forth translationally in the axial direction of the mixing and plasticating machine. This prevents air and powder or granulate particles entrained therein from being able to pass through the stuffing box into the gearbox flange. Furthermore, as a result of the entrainment and transfer of primarily the fine particles of a mixture of different components of the starting material into the gearbox flange, the mixing ratio of the components of the starting material in the process chamber is undesirably changed. In addition, the screw flight is thereby optimally filled with the starting material, specifically in particular also in the case of powder with a very low bulk density. After this, in the operation of the mixing and plasticating machine according to the invention, the seal, in particular a stuffing box, arranged between the support shaft of the screw shaft, the housing wall surrounding the latter and the gearbox flange, is relieved, so that its operating time or the time span, during which the latter keeps the connecting region between the support shaft and the gearbox flange air-tight or reliably prevents air and particulate material from penetrating from the process chamber of the mixing and plasticating machine into the gearbox flange, is significantly extended. During the operation of the mixing and plasticating machine according to the invention, it is only necessary to ensure that the starting material is fed only through one of the at least two cavities of the filling device of the mixing and plasticating machine, while at least one other of the at least two cavities of the filling device is kept free.

In a further development of the idea of the invention, it is proposed, that the at least two cavities of the filling device are separated from each other such that at least one of the at least two cavities—when viewed in the longitudinal direction of the housing—is arranged offset or at least partially offset relative to at least one other of the at least two cavities. In this context, arranged offset means, that the one cavity is arranged upstream of the other cavity. Upstream and downstream thereby mean, that the upstream cavity is arranged closer to the upstream end of the housing of the mixing and plasticating machine than the downstream cavity, or that the downstream cavity is arranged closer to the downstream end of the housing of the mixing and plasticating machine than the upstream cavity. The upstream end of the housing of the mixing and plasticating machine is thereby the end of the housing, which is connected to the drive or to which the starting material is fed, and the downstream end of the housing of the mixing and plasticating machine is the end of the housing from which the mixed and plasticated product is discharged. In this context, arranged partially offset means that the upstream part of a cavity is arranged upstream of the upstream part of the other cavity, whereas the other parts of the two cavities can be arranged next to one another relative to the longitudinal direction of the housing. By arranging at least a part of one of the cavities of the filling device upstream of another of the cavities of the filling device, it is possible that the starting material is fed to the process chamber or interior of the housing of the mixing and plasticating machine only through the downstream cavity of the filling device, whereas the upstream cavity of the filling device is left open and can thus act as a venting channel. As a result, the air introduced through the starting material fed through the downstream cavity of the filling device into the interior of the housing of the mixing and plasticating machine is pressed under the lower opening of the upstream cavity of the filling device during the backward stroke of the screw shaft, so that the air can escape from the filling device again from the bottom upwards through the upstream cavity.

With regard to the shape of the filling device, the present invention is not particularly restricted as long as at least one of the cavities of the filling device is dimensioned and designed in such a way that the provided quantity of starting material can be fed per unit of time. Good results are obtained in particular, if the filling device is in the form of a cuboid, a cylinder, a cone, a truncated cone, an inverted cone, an inverted truncated cone, a wedge, a wedge stump, an inverted wedge or an inverted wedge stump. As set forth above, the filling device extends through a cut-out extending through the housing wall or is connected to a cut-out extending through the housing wall. A filling device extending through a cut-out extending through the housing wall is thereby understood to mean, that the lower side walls of the filling device extend along the inner edges of the cut-out and are connected thereto, because otherwise an unacceptable cavity would arise between the lower side walls of the filling device and the inner edges of the cut-out. In contrast, a filling device connected to a cut-out extending through the housing wall is understood to mean that the lower side walls of the filling device rest flush on the upper boundary of the cut-out, so that the inner edges of the lower side walls of the filling device are connected flush to the inner edges of the cut-out. Irrespective of whether the filling device extends through a cut-out extending through the housing wall or is connected to a cut-out extending through the housing wall, the sum of the cavities is understood as a filling device, which cavities are formed by the side walls of the filling device and the inner edges of the cut-out. Accordingly, when the filling device is placed on the cut-out, the sum of the filling device and the cut-out is understood as the filling device. An inverted wedge or inverted wedge stump thereby denotes a wedge or wedge stump rotated by 180° with respect to the horizontal, i.e., a wedge or wedge stump, in which the larger base surface is arranged at the top.

According to a further preferred embodiment of the present invention, it is provided that the sides of the filling device are closed by walls, the lower end of the filling device is open and the upper end of the filling device is open or is provided with a cover provided with two or more open connecting pieces.

In order to separate the at least two cavities of the filling device of the mixing and plasticating machine in such a way that no fed starting material can pass from one cavity into the other, it is particularly preferred that the at least one separating wall extends over the entire height of the filling device. However, it is also possible, although less preferred, that the at least one separating wall extends over at least 50% or over at least 80% or over at least 90% of the entire height of the filling device, specifically preferably from the lower edge of the filling device or the cut-out of the housing wall, when the filling device rests thereon, and more preferably from just above the outermost boundary of the screw shaft, namely from 0.1 to 10 mm, more preferably 0.3 to 5 mm and very particularly preferably 0.5 to 2 mm above the outermost boundary of the screw shaft. In cases in which the at least one separating wall extends over at least 50% or over at least 80% or over at least 90% of the entire height of the filling device, the starting material is to be introduced with appropriate care into the feed shaft of the filling device. Height of the filling device is thereby understood to mean the vertical distance from the lower edge of the filling device or the cut-out of the housing wall, when the filling device rests thereon, up to the upper end of the side walls, i.e., in the event that a cover is arranged on the upper end of the filling device, up to the lower edge of the cover, irrespective of whether even further structures, such as filling necks, are present on the cover.

According to a further preferred embodiment of the present invention, it is provided that the filling device has the form of a cuboid, a wedge stump or an inverted wedge stump, wherein a separating wall extends at least substantially parallel to the cross-sectional area of the housing over at least 50%, preferably over at least 80%, particularly preferably over at least 90% and most preferably over the entire height of the filling device and over at least 50%, preferably over at least 80%, particularly preferably over at least 90% and most preferably over the entire width of the filling device. In this context, substantially parallel to the cross-sectional area means that the separating wall is arranged at an angle of +20° C. to −20°, preferably of +10° C. to −10° and particularly preferably of +5° C. to −5° to the cross-sectional area. Most preferably, the separating wall extends parallel to the cross-sectional area of the housing.

In a further development of the idea of the invention, it is proposed, that the filling device comprises two separating walls, of which one separating wall extends at least substantially parallel to the cross-sectional area of the housing and the other separating wall extends at least substantially parallel to the longitudinal surface of the housing, wherein the two separating walls are connected to one another in such a way that, when viewed in the cross-section of the filling funnel, two completely separate cavities are provided. In this way, cavities arranged offset in relation to one another in the filling device can be realized in a simple manner. Also, in this embodiment, it is preferred that both separating walls extend over at least 50%, more preferably over at least 80%, particularly preferably over at least 90% and most preferably over the entire height of the filling device.

Furthermore, it is preferred that i) between the gearbox flange and the upstream end of the housing connected thereto and/or ii) in the upstream end of the housing, a seal, preferably a stuffing box, sealing the screw shaft with respect to the inner peripheral surface of the housing is provided, and in the housing at least one relief channel is provided, which extends from the inner peripheral surface of the housing in some sections into the housing (i.e., into the housing wall) and is connected to the upstream end of the filling device, which relief channel extends from the upstream end of the filling device, when viewed in the longitudinal direction of the housing, at least in some sections, in the direction of the seal. As set forth above, the seal is necessary to prevent air and/or starting material from penetrating into the gearbox flange during a backward stroke of the screw shaft moving back and forth in an axially translational manner. By providing at least one relief channel, which extends from the upstream end of the filling device, when viewed in the longitudinal direction of the housing, at least in some sections, in the direction of the seal, it is achieved that the air with any entrained starting material, which is pressed in the upstream direction during a backward stroke of the screw shaft moving back and forth in an axially translational manner and is not discharged by the filling device through the upstream cavity of the filling device acting as a venting channel, but passes into a region upstream of the upstream end of the cavity of the filling device acting as a venting channel, is fed through the at least one relief channel to the venting channel and is thus discharged from the mixing and plasticating machine via the filling device. As a result, the seal and preferably the stuffing box are still further relieved. A relief channel extending in some sections into the housing is understood to mean a depression, which extends from the inner peripheral surface of the housing into the housing wall, but not completely through the housing wall. In this case, the depression can have any desired geometric shape in top view, therefore a different shape than a rectangular one. The component channel in the phrase relief channel is meant here functionally and is not related to the geometric shape of the relief channel. However, the relief channel preferably has a rectangular shape in top view, therefore, when viewed three-dimensionally, has the shape of a channel.

The relief channel preferably extends on the inner peripheral surface of the housing from the upstream inner edge of the cut-out, through which the lower part of the filling device or the lower parts of the side walls of the filling device extend, or to which the lower part of the filling device or the lower parts of the side walls of the filling device are connected, at least substantially parallel to the longitudinal direction of the housing in the upstream direction in the direction of the seal or stuffing box. In this context, substantially parallel to the longitudinal direction of the housing means, that the relief channel is arranged at an angle of +20° C. to −20°, preferably of +10° C. to −10° and particularly preferably of +5° C. to −5° to the longitudinal direction of the housing. Most preferably, the relief channel extends parallel to the longitudinal direction of the housing. Alternatively, the relief channel can also extend in the form of a spiral or the like.

The housing of such a mixing and plasticating machine is usually composed of two housing halves, which can be folded away from one another or can be folded to form a closed housing. In the case of housing halves, it is preferred that a relief channel is provided at the edge of the inner peripheral surface of one of the two housing halves or in each case one relief channel is provided at the edge of the inner peripheral surface of each of the two housing halves. In this case, the relief channel or the relief channels can be produced simply by milling a groove on the edge of the housing half wall.

In a further development of the idea of the invention, it is proposed, that the at least one relief channel extends from the upstream end of the filling device over at least 20%, preferably at least 40%, more preferably at least 60%, even more preferably at least 80%, particularly preferably at least 90% and most preferably over the entire length up to the seal. As a result, a particularly high proportion of the air fed back into the region of the stuffing box during the backward stroke of the screw shaft is guided via the relief channel into the venting channel and is discharged from the mixing and plasticating machine through the venting channel.

According to a further preferred embodiment of the present invention, it is preferred that the at least one relief channel extends from the inner peripheral surface of the housing by 1 to 50%, preferably by 2 to 20% and particularly preferably by 2 to 10%, into the housing wall and/or has a width of 0.005 to 0.5 Da, preferably 0.02 to 0.3 Da, particularly preferably 0.05 to 0.2 Da and very particularly preferably 0.08 to 0.12 Da, such as approximately 0.1 Da, wherein Da is the diameter of the hollow interior, and, when the hollow interior is not cylindrical, the greatest distance is from a point of the inner peripheral surface to a perpendicular opposite point of the inner peripheral surface of the housing. For example, the width is 0.1 mm to 100 mm, preferably 0.5 mm to 20 mm and more preferably 0.5 mm to 10 mm. Such a relief channel has a sufficiently large volume for efficient removal of air.

With regard to the geometry of the at least one relief channel, the present invention is not particularly restricted.

Good results are obtained in particular when the at least one relief channel has an oval, round, rectangular or square and preferably a rectangular or square cross-section.

According to a further very particularly preferred embodiment of the present invention, it is provided that the seal is a stuffing box, in which at least one metal ring or plastic ring made of temperature-resistant plastic is provided between the packing cords, wherein at least one connecting channel is provided in the longitudinal section of the housing radially surrounding the seal or stuffing box, via which connecting channel a gas can be flowed into the interior of the housing from the upstream region of the housing. The metal ring or plastic ring can in particular also be designed in two parts so that it can be easily exchanged without the screw shaft having to be removed. By means of the at least one connecting channel, a further relief of the seal or stuffing box can be achieved, by a gas acting as a barrier fluid, such as air or nitrogen, or a liquid acting as a barrier fluid, such as water or another product-compatible liquid, being fed via the at least one connecting channel into the interior of the housing, specifically preferably at a higher pressure than the pressure present in the interior. The barrier fluid is distributed over the metal ring or plastic ring. In this way, it is achieved that the resistance to any penetration of air through the interior of the housing is increased by the seal or stuffing box and thus the stuffing box is further relieved. In addition, as a result, it is even more reliably avoided that any material particles entrained by the air penetrate into the seal or stuffing box. As a result, the service life of a seal or stuffing box in the mixing and plasticating machine is drastically increased, namely, for example, from 2 weeks to over 6 months. The barrier fluid which has penetrated into the interior passes via the relief channel into the venting channel and leaves the mixing and plasticating machine via the latter, so that the introduced barrier fluid does not impair the conditioning of the starting material in the mixing and plasticating machine.

In a further development of the idea of the invention, it is proposed in each of the embodiments described above to additionally provide a measuring device, which sets and monitors and preferably generates an alarm when the pressure is too low. For this purpose, in particular a pressure measuring device can be used.

According to the invention, the mixing and plasticating machine comprises a filling device designed as described above. In addition, the mixing and plasticating machine can, but does not need to have one or more further filling devices. Each of the optional further filling device(s) can be designed like the filling device according to the invention described above. Preferably, however, each of the optional additional filling device(s) is configured differently from that described above, namely as a side feed to the housing. If the mixing and plasticating machine has two or more filling devices, it is preferred that at least the filling device arranged most upstream is configured as described above. The one or more filling devices arranged downstream thereof can be provided, for example, in order to add a further component to be mixed into the interior of the mixing and plasticating machine at a point in which the component(s) already added upstream thereof have already been pre-mixed or melted to a certain extent.

According to the present invention, a mixing and plasticating machine comprises a housing and a screw shaft arranged in the housing. The housing preferably comprises two housing halves, which can be lined on the inside with a so-called housing shell, but do not have to be. The housing shell, if present, is thereby considered as a component of the housing in the present patent application. When the two housing halves are closed, the inner peripheral surface of the housing delimits a preferably cylindrical hollow interior, therefore an interior with a circular cross-section. The screw shaft comprises a shaft rod or a support shaft, on the peripheral surface of which wing elements are arranged, which extend radially outwards on the peripheral surface of the shaft rod, wherein the individual wing elements are spaced apart from one another. In addition, receptacles for plasticating elements, such as for plasticating bolts, plasticating teeth and the like, are provided in the two housing halves. Each of the receptacles is thereby a borehole, which extends through the housing wall from the inner peripheral surface of the housing. The receptacles for the plasticating bolts, which in each case are spaced apart from one another, thereby extend in each of the two housing halves, when viewed in the axial direction, preferably in the form of at least two rows and preferably two to six rows. The wing elements are also arranged on the peripheral surface of the shaft rod in at least two and preferably two to six rows extending in the axial direction of the screw shaft.

A further subject matter of the present invention is a method for mixing and plasticating a starting material, which is operated in a previously described mixing and plasticating machine. The method according to the invention comprises the step of turning on the drive and feeding the starting material to be mixed and plasticated into the interior of the housing via selectively only one of the at least two cavities of the filling device.

Preferably, the method is carried out in a previously described mixing and plasticating machine, which comprises at least one relief channel and at least one connecting channel, wherein the gas or barrier fluid is introduced into the housing with a pressure, which is higher than the pressure present in the interior of the housing by 500 Pa to 10 MPa and preferably by 10 KPa to 0.3 MPa.

The present invention is described in detail below with reference to the drawing, in which.

Figure 1A:
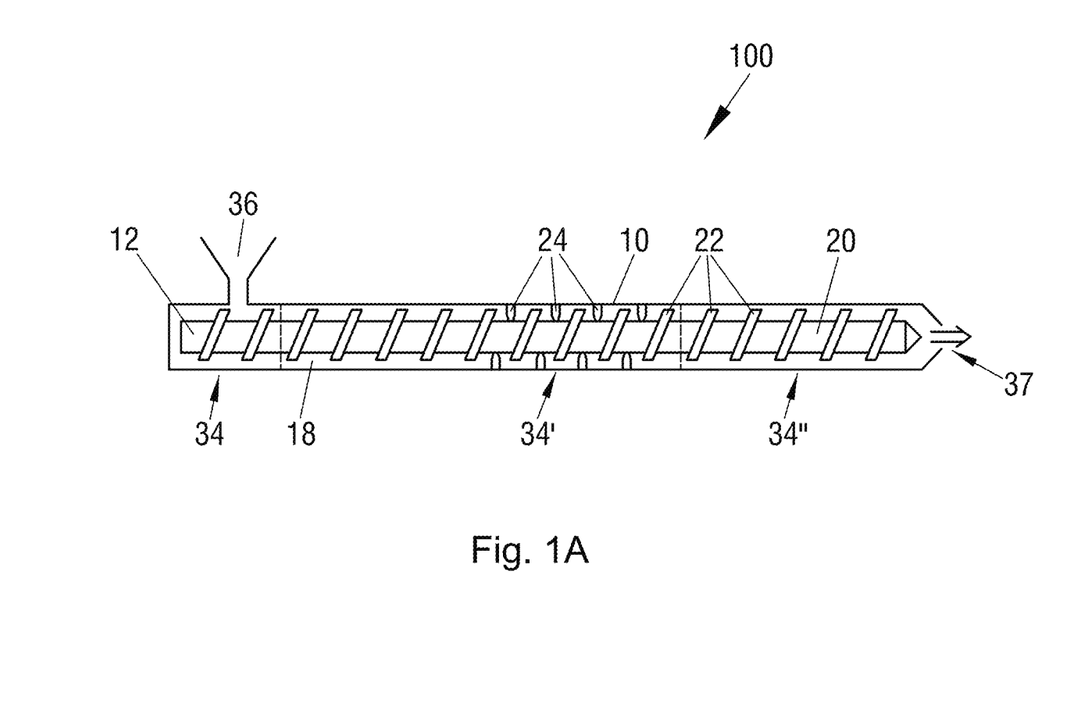
FIG. 1*a* shows a schematic longitudinal section of a mixing and plasticating machine.
Figure 1B:
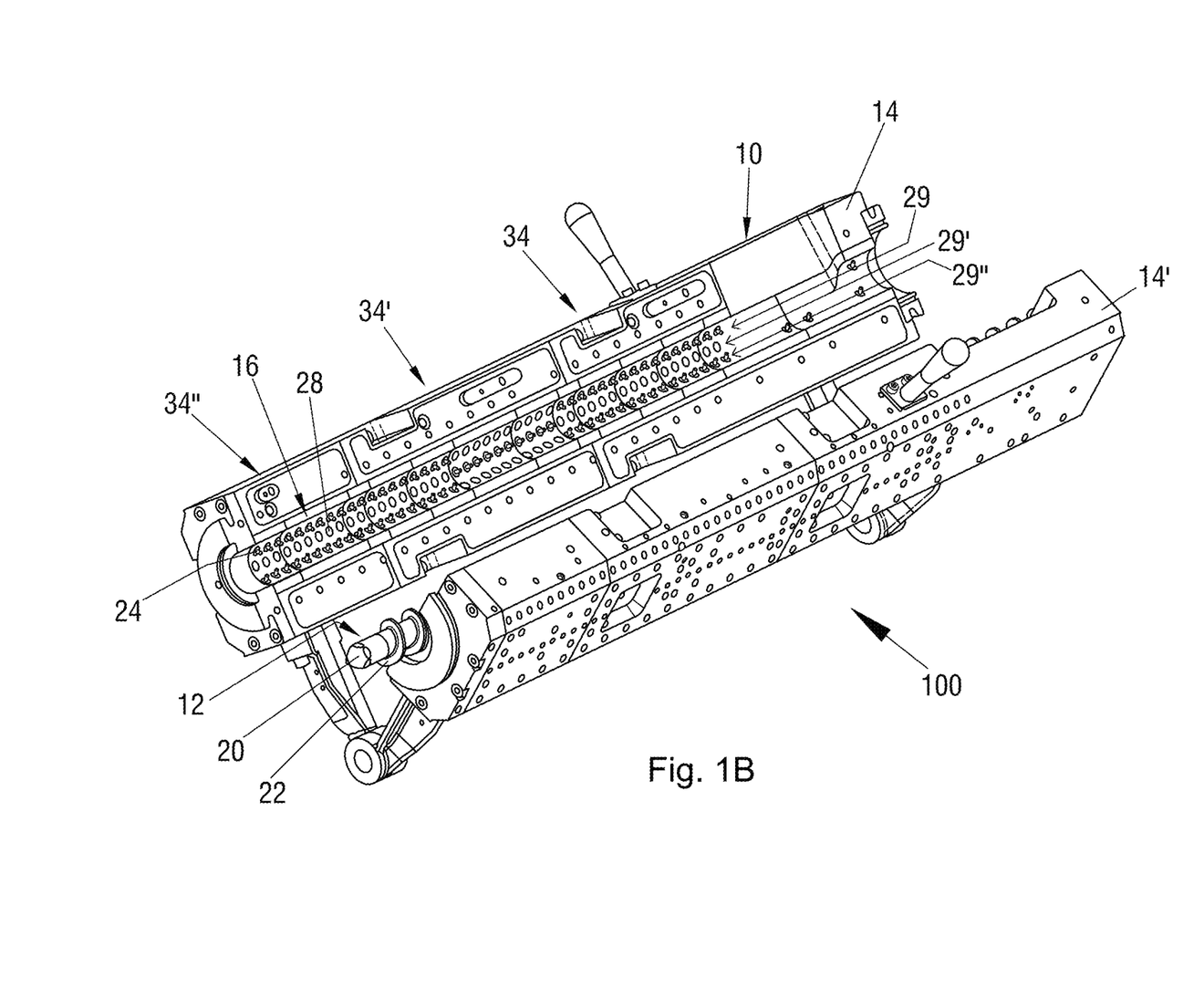
FIG. 1*b* shows a perspective view of the housing of the mixing and plasticating machine shown in FIG. 1*a*.

The mixing and plasticating machine shown in FIGS. 1*a* and 1*b* and designated as a whole with 100 comprises a housing 10 and a screw shaft 12 arranged in the housing 10. The housing 10 comprises two housing halves 14, 14', which are lined on the inside with a so-called housing shell 16. The housing shell 16 is thereby considered to be a component of the housing 10 in the present patent application. When the two housing halves 14, 14' are closed, the inner peripheral surface of the housing 10 delimits a cylindrical hollow interior 18, therefore an interior 18 with a circular cross-section. The screw shaft 12 comprises a shaft rod 20, on the peripheral surface of which wing elements 22 are arranged, which extend radially outwards on the peripheral surface of the shaft rod 20, wherein the individual wing elements 22 are spaced apart from one another. Receptacles 28 for plasticating elements 24, i.e., for plasticating bolts, plasticating teeth and the like, are provided in the two housing halves 14, 14'. Each of the receptacles 28 is thereby a borehole, 28, which extends through the housing wall from the inner peripheral surface of the housing shell 16. The lower, radially inner-lying end of each receptacle 28 can, for example, be designed square in cross-section. Each plasticating bolt 24 can then have, for example, at its lower end, an end which fits precisely into the square radially inner end of the receptacles 28 and is thereby fixed in the receptacle 28 in a manner secured against rotation in the inserted state. The plasticating bolt 24 is connected at its end located in the receptacle 28 to a fixing element (not shown) inserted in the overlying end of the receptacle 28 by screwing. Alternatively, the plasticating bolt 24 can also have an internal thread for a screw and can be fixed with a screw instead of by means of the fixing element and the nut.

As can be seen in particular from FIG. 1*b*, the receptacles 28, which are equally spaced apart from one another, for the plasticating bolts 24 in each of the two housing halves 14, 14', when viewed in the axial direction, extend in the form of three rows 29, 29', 29". Thus, the total number of rows of receptacles 29, 29', 29" of the housing is six. Within the meaning of the present invention, row is understood to mean that a connecting line laid over the receptacles 28 of a row 29, 29', 29" spaced apart from one another in the axial direction is a straight line. As shown in FIGS. 1*a* and 1*b*, the mixing and plasticating machine 100 is divided in the axial direction into a plurality of process sections 34, 34', 34", wherein each process section 34, 34', 34" with respect to the number of plasticating bolts 24 as well as the number and extent of the wing elements 22 on the shaft rod 20 is adapted to the function of the individual process sections 34, 34', 34". As shown in FIG. 1*b*, two rows, namely the upper row 29 and the lower row 29", are equipped with plasticating bolts 24 in the left-hand section 34 and in the right-hand section 34" of the upper housing half 14 of the three rows 29, 29', 29" of receptacles 28 for plasticating bolts 24, whereas the middle row 29' is not equipped with plasticating bolts 24. In contrast, a row, namely the middle row 29', is equipped with plasticating bolts 24 in the middle section 34' of the upper housing half 14 of the three rows 29, 29', 29" of receptacles 28 for plasticating bolts 24, whereas the upper row 29 and the lower row 29" are not equipped with plasticating bolts 24. Also, in the middle section 34' of the lower housing half 14', only the middle row is equipped with plasticating bolts, so that the middle section 34' of the housing 10 has a total of two rows of opposite plasticating bolts 24, i.e., the angle between the two rows of plasticating bolts 24 on the inner peripheral surface of the housing 10 is 180°. The starting material to be mixed is fed to the mixing and plasticating machine 100 via the filling device 36 designed as a filling funnel, then guided through the process sections 34, 34', 34" and finally discharged via the outlet opening 37. Instead of the process sections 34, 34', 34" shown, the mixing and plasticating machine 100 according to the invention can also have more process sections, such as in particular also four process sections, or fewer process sections, such as two or one process section.

Figure 2:
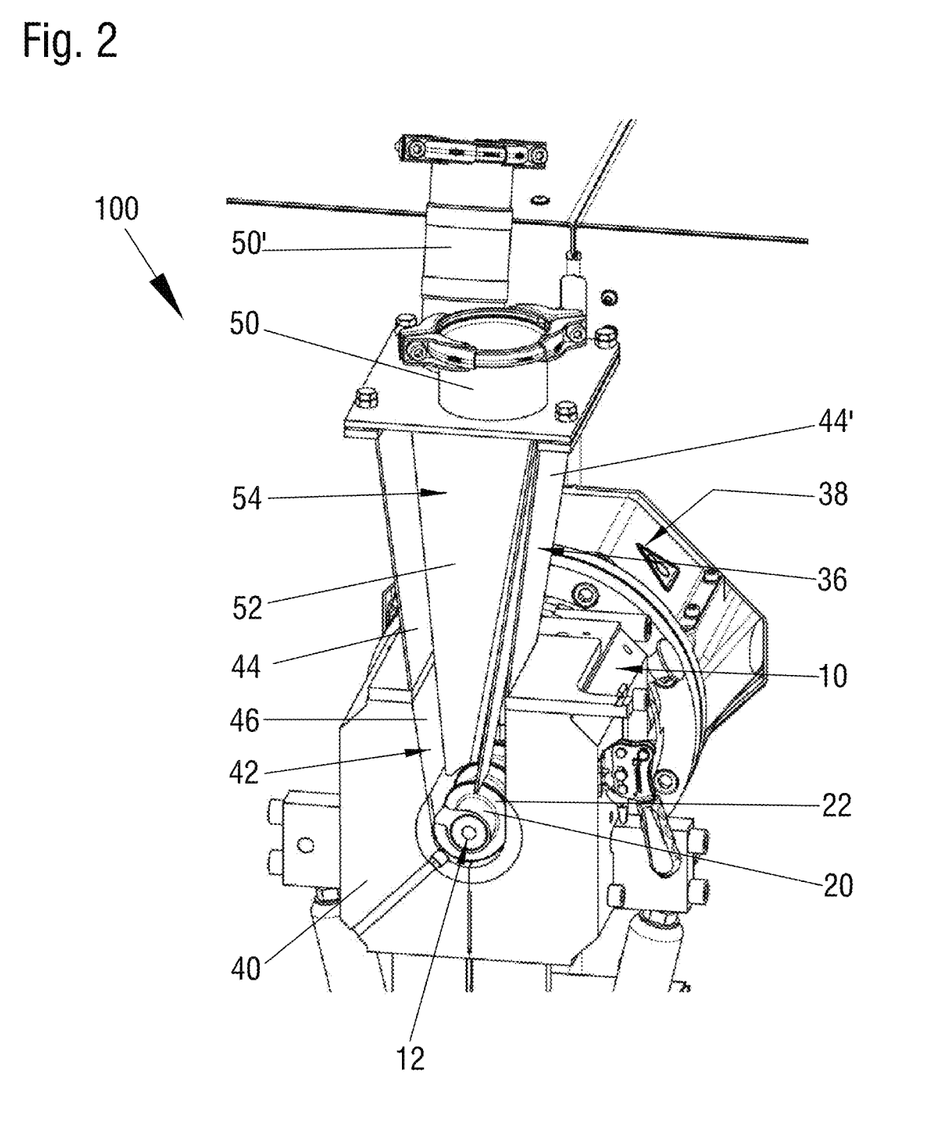
FIG. 2 shows a cross-section of the housing and of the filling device of a mixing and plasticating machine according to an embodiment of the present invention.

The mixing and plasticating machine 100 according to the present invention shown in FIG. 2 is similar to that shown in FIGS. 1*a* and 1*b*, and further comprises a drive, by which the screw shaft 12 is driven or rotated during operation of the mixing and plasticating machine 100. A gearbox is arranged between the drive and the upstream end of the housing, which gearbox is connected to the upstream end of the housing via a gearbox flange 38. The filling device 36 arranged on the housing 10 for feeding at least one starting material to be mixed and plasticated into the interior 18 of the housing 10 is connected to a cut-out 42 extending through the housing wall 40. The filling device 36 thereby has the shape of an inverted wedge stump. The side walls 44, 44' laterally delimiting the filling device 36 are placed with their respective lower end flush on the upper boundary of the cut-out 42, so that the inner edges of the lower side walls 44, 44' of the filling device 36 are connected flush with the inner edges 46 of the cut-out 42. The upper end of the filling device 36 is delimited by a cover 48, wherein the cover 48 comprises two open connecting pieces 50, 50'. According to the invention, a separating wall 52 extending over the entire height and width of the filling device 36 is provided in the filling device 36, which separating wall separates the filling device into two cavities 54, 54'. The two cavities 54, 54' are thereby arranged offset with respect to one another, when viewed in the longitudinal direction of the housing 10, wherein the cavity 54, when viewed from the upstream end of the housing 10 facing the drive, is arranged downstream of the other (in FIG. 2 rear cavity).

In the operation of the mixing and plasticating machine 100 shown in FIG. 2, starting material is continuously introduced into the interior 18 of the mixing and plasticating machine 100 through the downstream cavity 54 of the filling device 36 serving as a filling channel. As a result of the feeding of the starting material via the cavity 54 of the filling device 36 air introduced into the interior 18 largely penetrates via the lower opening of the adjacent cavity (in FIG. 2 rear cavity) into the latter and is thereby discharged from the bottom upwards through the filling device 36. Therefore, the air introduced into the interior 18 during the feeding of the starting material is quickly and reliably removed, so that said air cannot accumulate or at least not to an appreciable extent in the interior space 18 and cannot be pressed against the seal which seals the screw shaft 12 during the backward stroke of the screw shaft 12, which moves translationally back and forth in the axial direction of the mixing and plasticating machine 100. This prevents air and powder or granulate particles entrained therein from being able to pass through the seal into the gearbox flange 38.

Figure 3A:
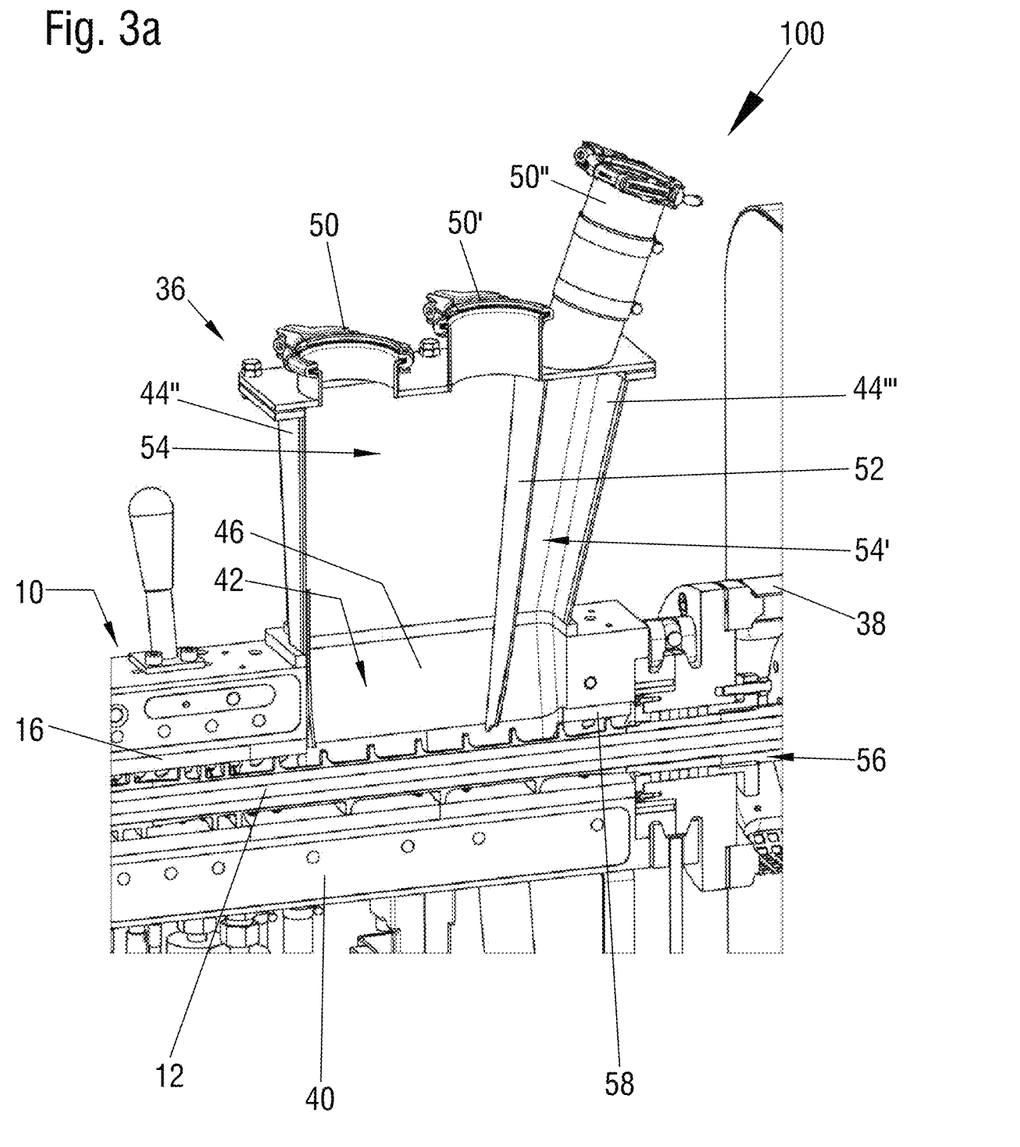
FIG. 3*a* shows a longitudinal section of the housing and the filling device of a mixing and plasticating machine according to another embodiment of the present invention.

In FIG. 3a a longitudinal section of the housing 10 and the filling device 36 of a mixing and plasticating machine 100 according to another embodiment of the present invention is shown. As shown in more detail in FIG. 3b, the filling device 36 thereby comprises two separating walls 52, 52', of which one separating wall 52 extends parallel to the cross-sectional area of the housing 10 and the other separating wall 52' extends parallel to the longitudinal surface of the housing 10. The two separating walls 52, 52' are thereby connected to one another in such a way that, when viewed in the cross-section of the filling funnel 36, two cavities 54, 54' are provided which are completely separated from each other. At the top, the filling device 36 is delimited by a cover 48 which comprises three connecting pieces 50, 50', 50". In this embodiment, a seal 56 in the form of a stuffing box 56 is provided between the gearbox flange 38 and the associated upstream end of the housing 10, in order to seal the screw shaft 12 against the inner peripheral surface of the housing 10. In addition, a relief channel 58 is arranged in the housing 10 or the housing wall 40. The relief channel 58 is a depression which extends from the inner peripheral surface of the housing 10 in some sections into the housing wall 40 and is connected to the upstream end of the filling device 36, which depression extends from the upstream end of the filling device 36, when viewed in the longitudinal direction of the housing 10, in the direction of the stuffing box 56, specifically parallel to the longitudinal direction of the housing 10.

Figure 3B:
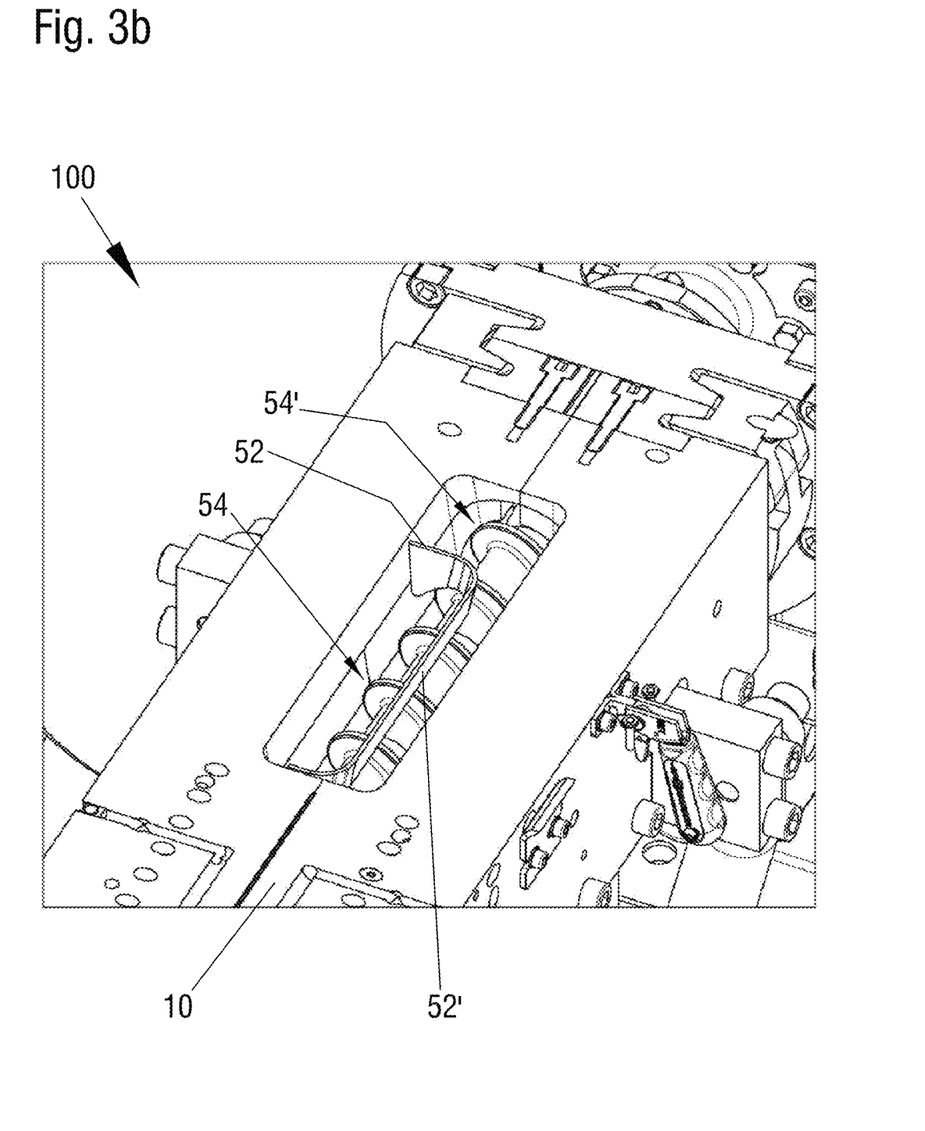
FIG. 3*b* shows a horizontal section of the filling device of the mixing and plasticating machine shown in FIG. 3*a*.

In the operation of the mixing and plasticating machine 100 shown in FIGS. 3a and 3b, in the case of a backward stroke of the screw shaft 12, which moves back and forth axially translationally, air with any entrained starting material, which is pressed in the upstream direction during a backward stroke of the screw shaft 12, which moves back and forth axially translationally and is not discharged by the filling device 36 through the upstream cavity 54' of the filling device 36 functioning as a venting channel 54', but rather passes into a region upstream of the upstream end of the cavity 54' of the filling device 36 functioning as a venting channel 54', is fed through the relief channel 58 to the venting channel 54' and is thus discharged from the mixing and plasticating machine 100 via the filling device 36. As a result, the stuffing box 56 is further relieved.

Figure 4:
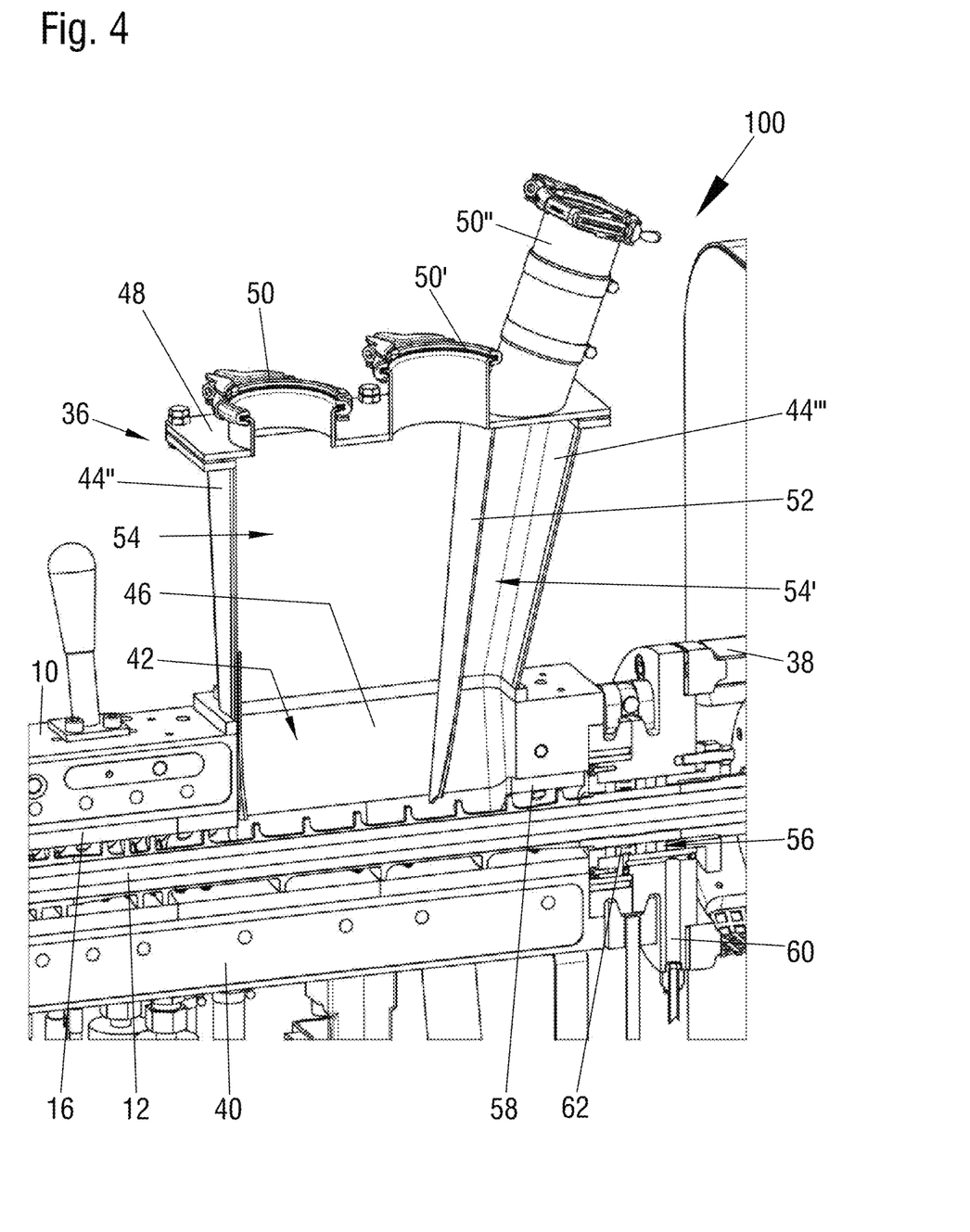
FIG. 4 shows a longitudinal section of the housing and of the filling device of a mixing and plasticating machine according to another embodiment of the present invention.

In the mixing and plasticating machine 100 shown in FIG. 4 according to another embodiment of the present invention, in comparison to the embodiment shown in FIGS. 3a and 3b, a connecting channel 60 is additionally provided, via which a fluid can be flowed into the interior 18 of the housing 10 from the downstream region of the housing 10. In addition, in this embodiment, the stuffing box 56 has a metal ring 62 between the packing cords. A further relief of the seal or stuffing box 56 can be achieved via the connecting channel 60 by feeding a gas acting as a barrier fluid, such as air or nitrogen, via the connecting channel 60 into the interior 18 of the housing 10, specifically preferably at a higher pressure than the pressure present in the interior 18. As a result, it is achieved that the resistance to any penetration of air from the interior 18 of the housing 10 through the seal or the stuffing box 56 is increased and thus the stuffing box 56 is further relieved. In addition, as a result, it is even more reliably avoided that any material particles entrained by the air penetrate into the seal or stuffing box 56. As a result, the service life of a seal or stuffing box in the mixing and plasticating machine 100 is drastically increased, namely, for example, from 2 weeks to over 6 months. The barrier fluid which has penetrated into the interior 18 passes via the relief channel 58 into the venting channel 54' and leaves the mixing and plasticating machine 100 via the latter.

LIST OF REFERENCE SIGNS

10 housing
12 screw shaft
14, 14' housing half
16 housing shell
18 hollow interior
20 shaft rod
22 wing element
24 plasticating element/plasticating bolt
28 receptacle/borehole for plasticating element
29, 29', 29" (axially extending) row of receptacles for plasticating elements
34, 34', 34" process section
36 filling device/filling funnel
37 outlet opening
38 gearbox flange
40 housing wall
42 cut-out of the housing wall
44, 44', 44", 44'" side wall of the filling device
46 inner edge of the cut-out
48 cover of the filling device
50, 50', 50" connecting piece of the cover 52, 52' separating wall of the filling device
54, 54' cavity of the filling device
56 seal/stuffing box
58 relief channel
60 connecting channel
62 metal ring of the stuffing box
100 mixing and plasticating machine

The invention claimed is:

1. A mixing and plasticating machine (100) for continuous conditioning processes, having a housing (10), in which a hollow interior (18) is formed that is delimited by the inner peripheral surface of the housing (10) and extends in the longitudinal direction of the mixing and plasticating machine (100), having a screw shaft (12) extending at least in some sections in the axial direction through the interior (18) of the housing (10), which screw shaft rotates during operation in the interior (18) of the housing (10) and simultaneously moves translationally back and forth in the axial direction, having a drive, which rotates the screw shaft (12) during operation, and having a filling device (36) arranged on the housing (10), for feeding at least one starting material to be mixed and plasticated into the interior (18) of the housing (10), wherein the filling device (36) extends through a cut-out (42) that extends through the a housing wall (40) or is connected to a cut-out (42) that extends through the housing wall (40), wherein the filling device (36) comprises at least two cavities (54, 54') that each extend over the height of the filling device (36), which cavities are separated from one another by at least one separating wall (52, 52') and wherein i) between a gearbox flange (38) and end of the housing (10) connected upstream therewith, or ii) in an upstream end of the housing (10), a seal (56) sealing the screw shaft (12) with respect to an inner peripheral surface of the housing (10) is provided; and in the housing (10), at least one relief channel (58) is provided that extends from the inner peripheral surface of the housing (10) in some sections into the housing (10) and is connected to an upstream end of the filling device (36), the relief channel (58) extending from the upstream end of the filling device (36), when viewed in a longitudinal direction of the housing, (10) at least in some sections in a direction of the seal (56).

2. The mixing and plasticating machine (100) according to claim 1, wherein the at least two cavities (54, 54') are separated from one another such that at least one of the at least two cavities (54, 54') of the filling device (36), when viewed in the longitudinal direction of the housing (10), is arranged offset upstream or at least partially offset upstream with respect to at least one other of the two cavities (54, 54').

3. The mixing and plasticating machine (100) according to claim 1, wherein the filling device (36) has the shape of a cuboid, a wedge, a truncated wedge, an inverted wedge or an inverted truncated wedge, which extends through the cut-out (42) or is connected to the cut-out (42).

4. The mixing and plasticating machine (100) according to, claim 1 wherein the sides of the filling device (36) are closed by walls (44, 44', 44", 44'''), the lower end of the filling device (36) is open and the upper end of the filling device (36) is open or is provided with a cover (48) provided with two or more open connecting pieces.

5. The mixing and plasticating machine (100) according to claim 1, wherein the at least one separating wall (52, 52') extends over at least 50% of the height of the filling device (36), wherein the at least one separating wall (52, 52') extends upwards from the lower edge of the filling device (36).

6. The mixing and plasticating machine (100) according to claim 1, wherein i) between the gearbox flange (38) and the end of the housing (10) connected upstream therewith or ii) in the upstream end of the housing (10) a stuffing box sealing the screw shaft (12) with respect to the inner peripheral surface of the housing (10) is provided.

7. The mixing and plasticating machine (100) according to claim 6, wherein in the stuffing box (56), between packing cords at least one metal ring (62) or plastic ring is provided, wherein in the longitudinal section of the housing (10) radially surrounding the stuffing box (56) at least one connecting channel (60) is provided, via which a gas can be flowed from an upstream region of the housing (10) into the interior (18) of the housing (10).

8. The mixing and plasticating machine (100) according to claim 1, wherein the at least one relief channel (58) extends, when viewed from the inner peripheral surface of the housing (10), by 1 to 50%, into the housing wall (40).

9. The mixing and plasticating machine (100) according to claim 1, wherein the at least one relief channel (58) has an oval, round, rectangular or square cross-section.

10. The mixing and plasticating machine (100) according to claim 1, wherein the width of the at least one relief channel (58) is 0.005 to 0.5 a diameter of the hollow interior.

11. A method for mixing and plasticating a starting material, wherein the method is operated in a mixing and plasticating machine (100) according to claim 1, wherein the drive is switched on and the starting material to be mixed and plasticated is fed via selectively only one of the at least two cavities (54, 54') of the filling device (36).

12. The method according to claim 11, wherein said method is carried out in a mixing and plasticating machine (100) according to claim 11 and a gas is introduced into the housing (10) with a pressure, which is higher by 500 Pa to 10 MPa a than the pressure present in the interior (18) of the housing (10).

* * * * *